United States Patent
Yokoyama et al.

(10) Patent No.: US 11,302,019 B2
(45) Date of Patent: Apr. 12, 2022

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventors: Yuki Yokoyama, Kanagawa (JP);
Ryosuke Higashikata, Kanagawa (JP);
Tomonari Takahashi, Kanagawa (JP);
Torahiko Kanda, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 16/910,685

(22) Filed: Jun. 24, 2020

(65) Prior Publication Data

US 2021/0241472 A1 Aug. 5, 2021

(30) Foreign Application Priority Data

Jan. 31, 2020 (JP) .................................. 2020-015797

(51) Int. Cl.
*G06T 7/50* (2017.01)

(52) U.S. Cl.
CPC ...................................... *G06T 7/50* (2017.01)

(58) Field of Classification Search
CPC .............................. G06K 9/00288; G06T 7/50
See application file for complete search history.

(56) References Cited

U.S. PATENT DOCUMENTS

| | | | |
|---|---|---|---|
| 8,903,533 B2 | 12/2014 | Eggers et al. | |
| 10,343,389 B2 | 7/2019 | Eggers et al. | |
| 2016/0092689 A1* | 3/2016 | Kulick | G06F 21/62 |
| | | | 726/28 |
| 2016/0379050 A1* | 12/2016 | Tian | G06K 9/00288 |
| | | | 382/118 |
| 2017/0210116 A1 | 7/2017 | Shirakawa | |
| 2017/0215495 A1* | 8/2017 | Okumiya | G01B 7/287 |
| 2017/0266883 A1 | 9/2017 | Yuji et al. | |
| 2019/0337284 A1 | 11/2019 | Eggers et al. | |

FOREIGN PATENT DOCUMENTS

| | | |
|---|---|---|
| JP | 2011-501251 A | 1/2011 |
| JP | 2017-134547 A | 8/2017 |
| JP | 2017-165012 A | 9/2017 |

* cited by examiner

*Primary Examiner* — Sam Bhattacharya
(74) *Attorney, Agent, or Firm* — Oliff PLC

(57) ABSTRACT

An information processing apparatus includes a processor configured to acquire three-dimensional-shape data that is data for a three-dimensional body and that represents a shape of a three-dimensional object, set in advance a feature requirement that indicates one or more features concerning a cross section of the three-dimensional body, detect one or more features that satisfy the feature requirement in the three-dimensional-shape data, and output information regarding the one or more features detected in the three-dimensional-shape data.

24 Claims, 12 Drawing Sheets

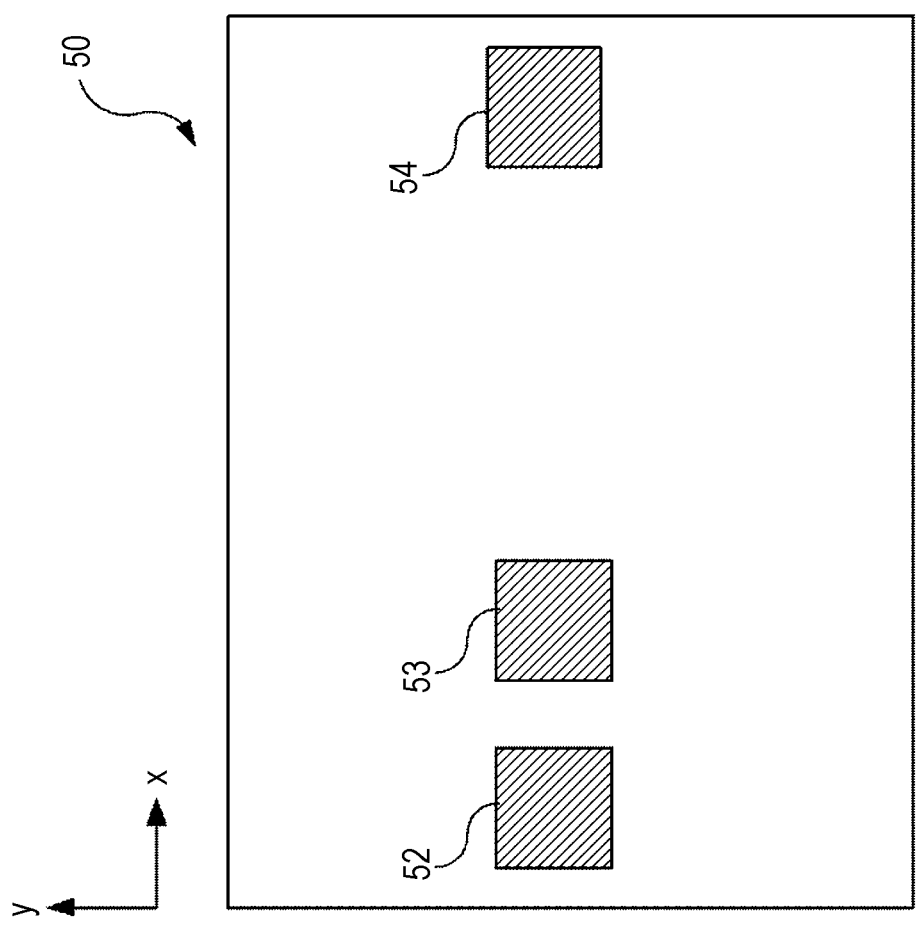
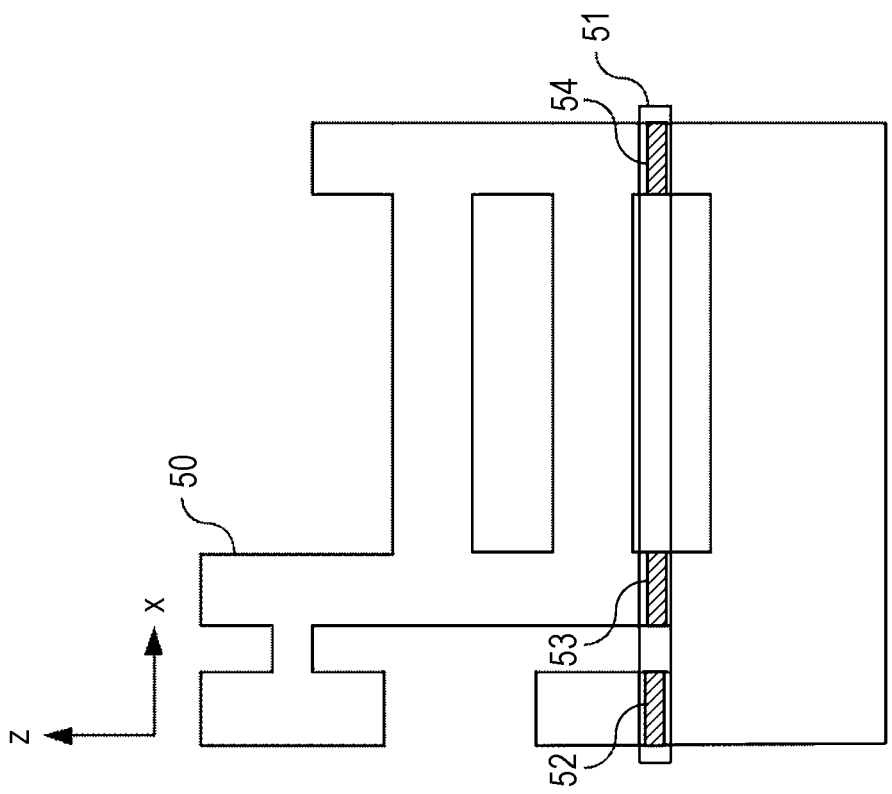

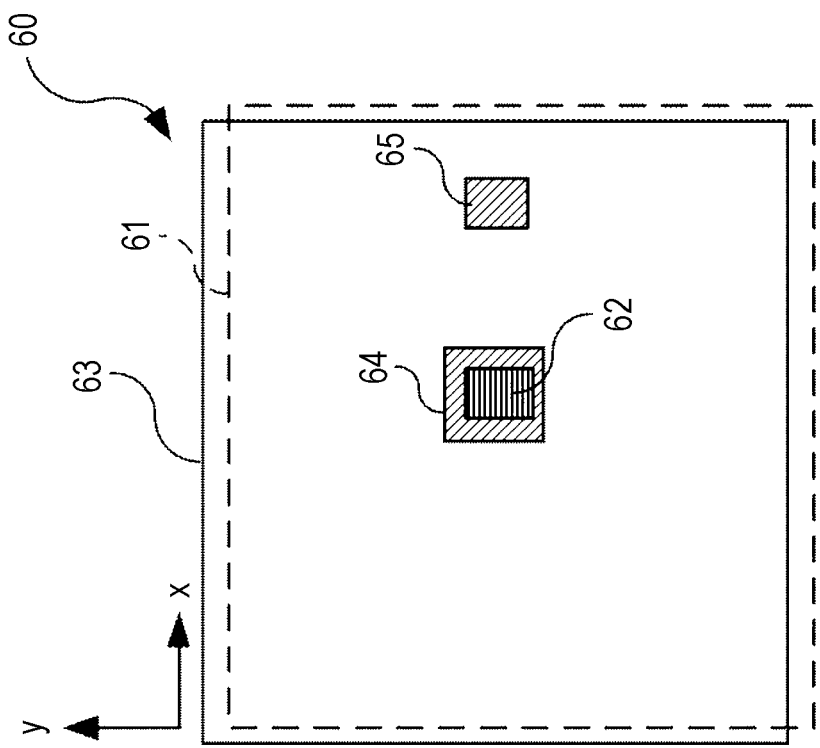
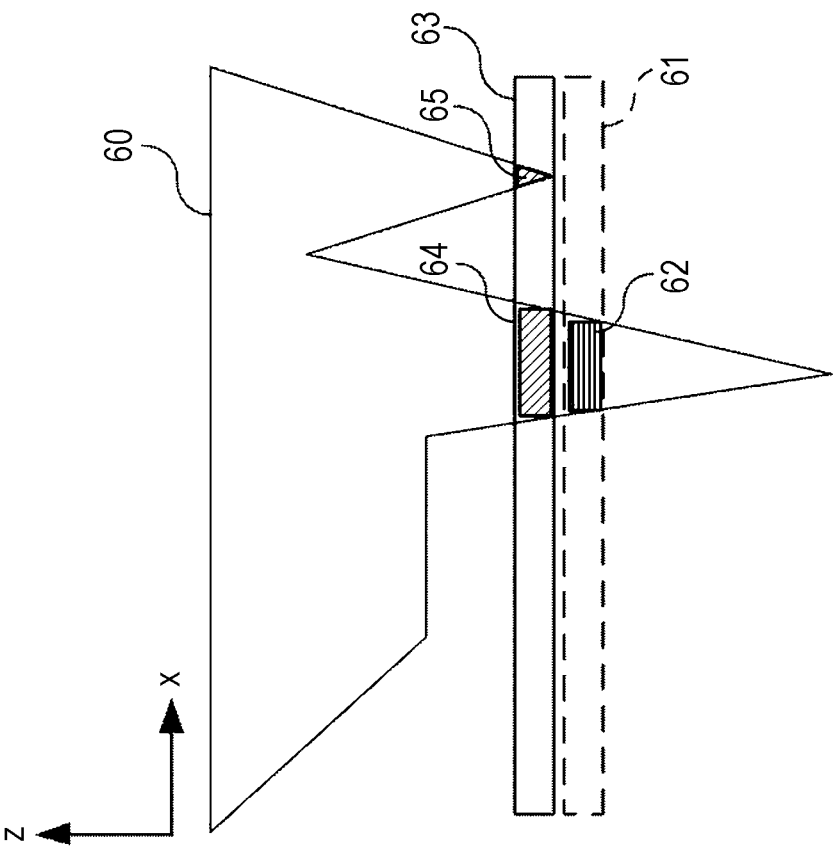

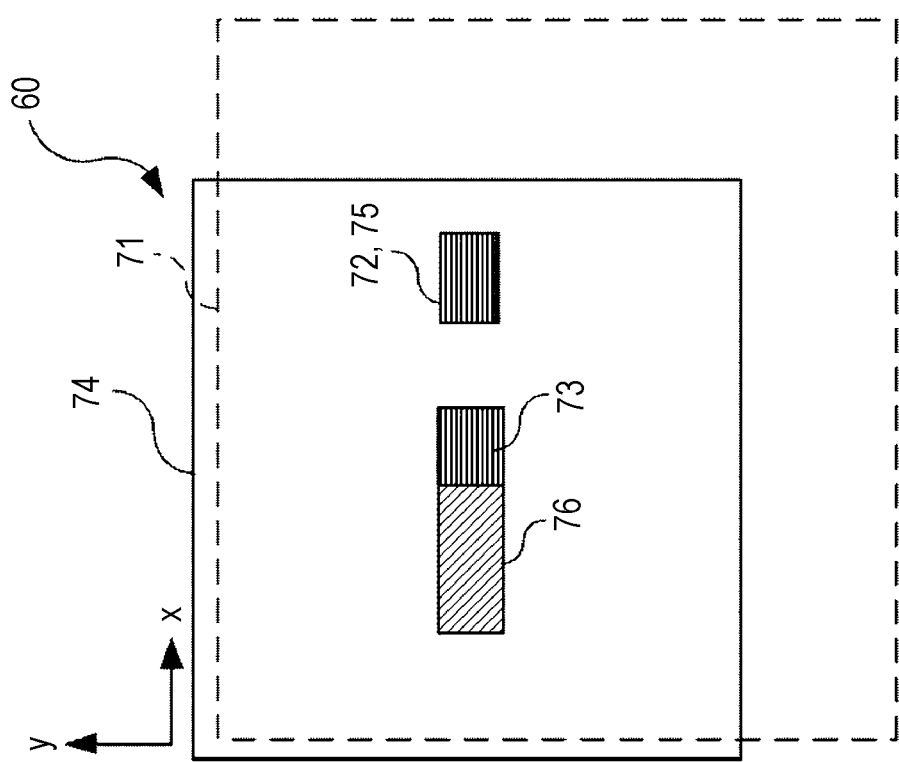
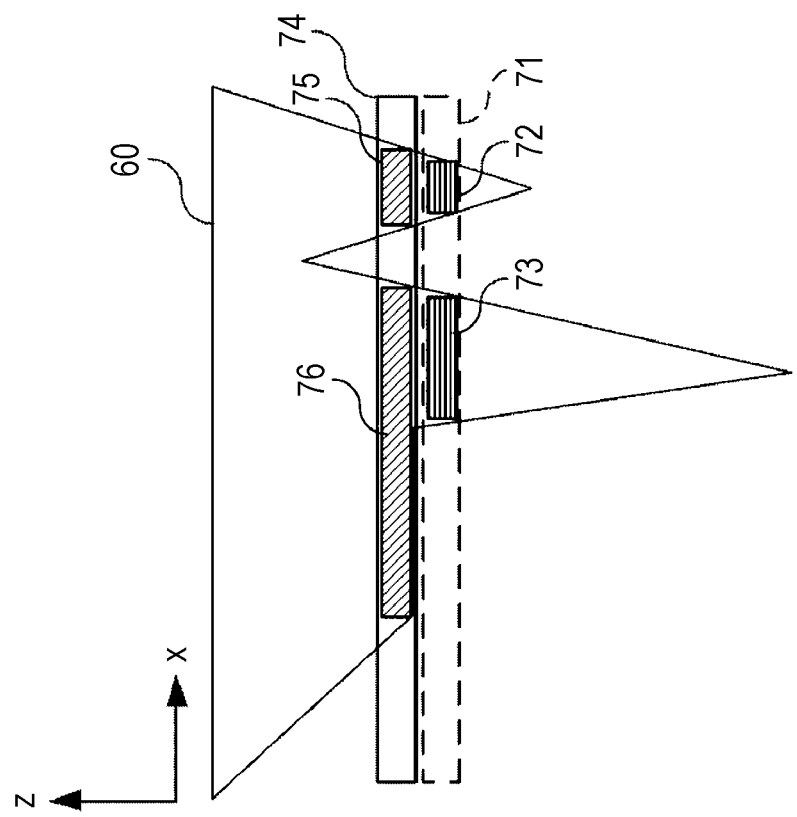

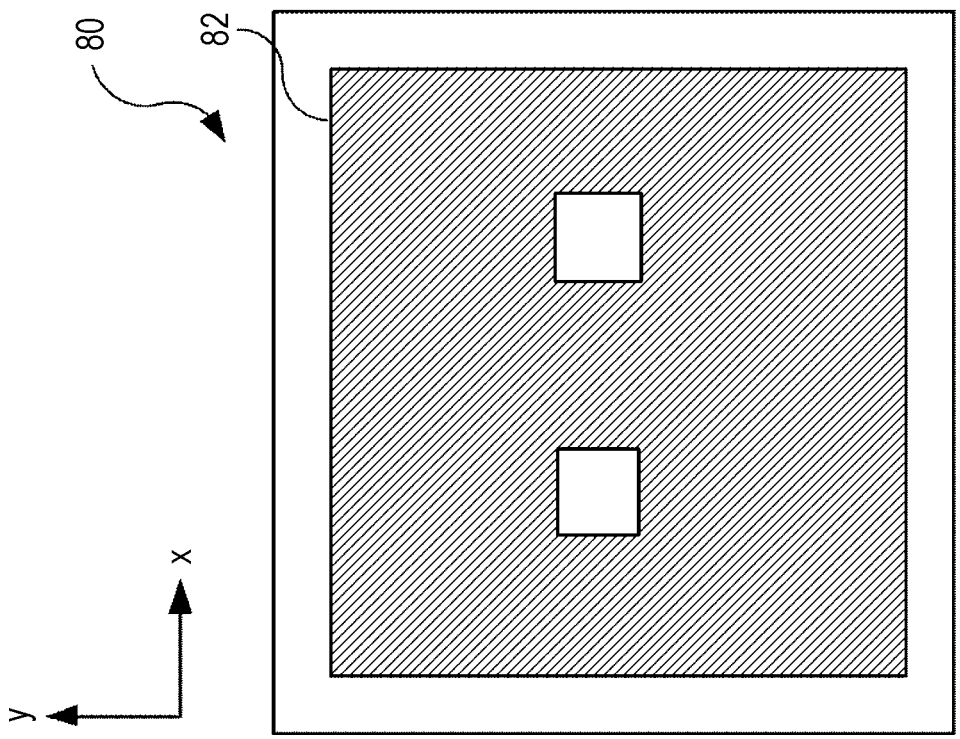
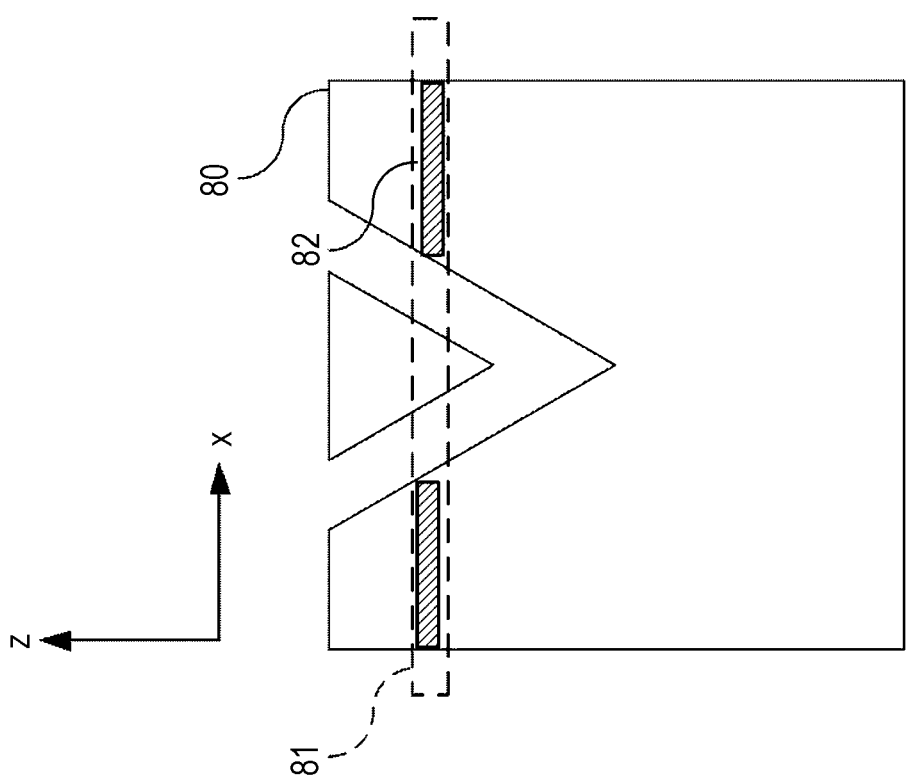

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-015797 filed Jan. 31, 2020.

BACKGROUND

(i) Technical Field

The present disclosure relates to an information processing apparatus and a non-transitory computer readable medium storing an information processing program.

(ii) Related Art

Japanese Unexamined Patent Application Publication No. 2017-134547 discloses an information processing apparatus that includes a provision unit, a reception unit, and a determination unit. The provision unit is configured to provide a screen via which a plurality of condition items can be specified. The plurality of condition items include at least a condition item indicating a strength-related feature of a three-dimensional object. The reception unit is configured to receive, via the screen, a specification of a condition item indicating a feature of an object desired to be molded by a user. The determination unit is configured to determine settings to be used for molding of the object desired to be molded by the user based on the received specification of the condition item. The settings to be used for the molding determined by the determination unit include molding settings specified for molding with respect to a molding apparatus.

Japanese Unexamined Patent Application Publication No. 2017-165012 discloses an information processing apparatus configured to provide data for manufacturing an object to an additive manufacturing apparatus that manufactures the object by layering a material based on a cross-sectional shape of the object. The information processing apparatus includes a shape-change detecting unit, a cross-sectional-shape-forming-position determining unit, and a cross-sectional-shape generating unit. The shape-change detecting unit uses data relating to the shape of the object and detects a shape-change coordinate at which the shape of the object changes. The cross-sectional-shape-forming-position determining unit determines a height at which the cross-sectional shape of the object is to be generated so that the height includes the shape-change coordinate. The cross-sectional-shape generating unit generates the cross-sectional shape of the object at the height at which the cross-sectional shape is generated and that is determined by the cross-sectional-shape-forming-position determining unit.

SUMMARY

When a three-dimensional-object forming apparatus forms a shape of a three-dimensional object (hereinafter, referred to as a "three-dimensional body") that includes a characteristic shape such as a thin wall or an excessive overhang, deformation or the like of the three-dimensional body sometimes occurs.

Thus, in the case of three-dimensional body formation, a known technology is used to detect in advance such a characteristic shape as a thin wall or an excessive overhang, and generation of deformation or the like of the three-dimensional body is prevented or reduced.

However, for three-dimensional body formation, a thin wall and an excessive overhang are not the only characteristic shapes that cause deformation or the like of a three-dimensional body. A characteristic shape other than a thin wall or an excessive overhang is detected by a user who checks the three-dimensional body before forming the shape. Thus, a large amount of time is spent to detect in advance such a characteristic shape as causes deformation or the like of the three-dimensional body.

Aspects of non-limiting embodiments of the present disclosure relate to an information processing apparatus and a non-transitory computer readable medium, which stores an information processing program, that enable a user to spend less time to detect a characteristic shape that causes deformation or the like of a three-dimensional body than in the case where the user detects such a characteristic shape as causes deformation or the like of the three-dimensional body.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to acquire three-dimensional-shape data that is data for a three-dimensional body and that represents a shape of a three-dimensional object, set in advance a feature requirement that indicates one or more features concerning a cross section of the three-dimensional body, detect one or more features that satisfy the feature requirement in the three-dimensional-shape data, and output information regarding the one or more features detected in the three-dimensional-shape data.

BRIEF DESCRIPTION OF THE DRAWINGS

An exemplary embodiment of the present disclosure will be described in detail based on the following figures, wherein:

FIGS. 6A and 6B are schematic illustrations depicting an example of a three-dimensional body used to describe feature detection according to the present exemplary embodiment;

FIGS. 8A and 8B are schematic illustrations depicting an example of cross sections of a three-dimensional body used to describe detection of a lowest point according to the present exemplary embodiment;

FIGS. 9A and 9B are schematic illustrations depicting an example of cross sections of a three-dimensional body used to describe detection of an excessive overhang according to the present exemplary embodiment;

FIGS. 10A and 10B are schematic illustrations depicting an example of a cross section of a three-dimensional body used to describe detection of a trap and a hollow structure according to the present exemplary embodiment;

DETAILED DESCRIPTION

Hereinafter, an exemplary embodiment for practicing the present disclosure will be described in detail with reference to the drawings.

Figure 1:
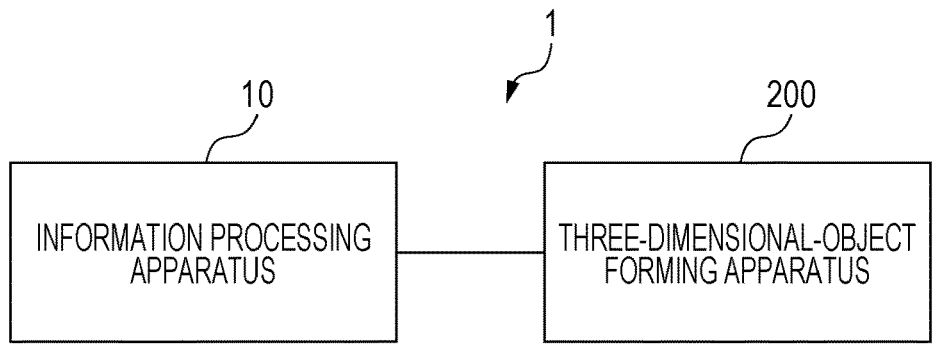
FIG. 1 is a block diagram depicting an example of a three-dimensional-object forming system according to the exemplary embodiment.

FIG. 1 is a block diagram of a three-dimensional-object forming system 1 according to the present exemplary embodiment. As depicted in FIG. 1, the three-dimensional-object forming system 1 includes an information processing apparatus 10 and a three-dimensional-object forming apparatus 200.

Figure 2:
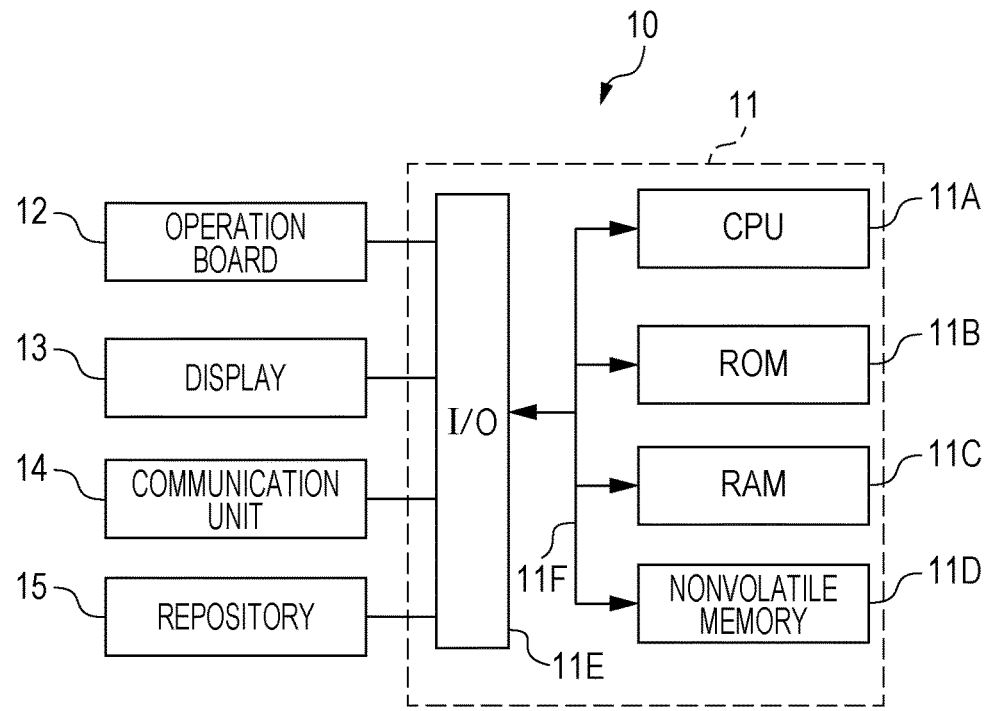
FIG. 2 is a block diagram depicting an example of an information processing apparatus according to the present exemplary embodiment.

Next, a configuration of the information processing apparatus 10 according to the present exemplary embodiment will be described with reference to FIG. 2.

For example, a personal computer or the like constitutes the information processing apparatus 10, which includes a controller 11. The controller 11 includes a central processing unit (CPU) 11A, a read-only memory (ROM) 11B, a random-access memory (RAM) 11C, a nonvolatile memory 11D, and an input/output interface (I/O) 11E. The CPU 11A, the ROM 11B, the RAM 11C, the nonvolatile memory 11D, and the I/O 11E are connected to each other by using a bus 11F. The CPU 11A is an example of a processor.

In addition, an operation board 12, a display 13, a communication unit 14, and a repository 15 are connected to the I/O 11E.

The operation board 12 includes, for example, a mouse and a keyboard.

The display 13 is constituted, for example, by a liquid crystal display or the like.

The communication unit 14 is an interface to perform data communication with external apparatuses, such as the three-dimensional-object forming apparatus 200.

The repository 15 is constituted by a nonvolatile memory device such as a hard disk and stores an information processing program, three-dimensional-shape data, and the like, which will be described below. The CPU 11A loads and executes the information processing program stored in the repository 15.

Next, a functional configuration of the CPU 11A will be described.

Figure 3:
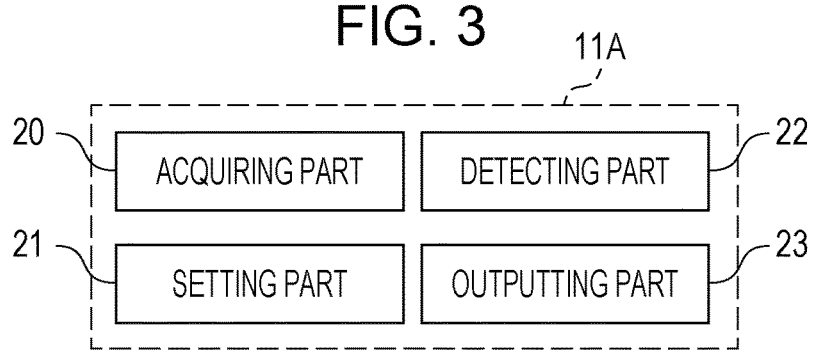
FIG. 3 is a block diagram depicting an example of a functional configuration of the information processing apparatus according to the present exemplary embodiment.

As depicted in FIG. 3, the CPU 11A includes an acquiring part 20, a setting part 21, a detecting part 22, and an outputting part 23 as functional parts.

The acquiring part 20 acquires the three-dimensional-shape data, in which a plurality of voxels are used to represent a three-dimensional body. The acquiring part 20 also acquires a requirement indicating one or more features of the three-dimensional body (hereinafter, referred to as a "feature requirement"). A feature concerns a cross section of the three-dimensional body.

Features in the present exemplary embodiment include a region where contraction difference occurs in a forming material during formation of a three-dimensional body, a region where pull-in occurs in a three-dimensional body while a forming material is cooled and solidifies, and a region where a structure is blown by a recoater and a nozzle and swayed during formation of a three-dimensional body.

Further, a feature requirement in the present exemplary embodiment is information to detect one or more features of the three-dimensional body described above, and the information concerns a cross section that represents one or more features of the three-dimensional body. Specifically, feature requirements include a cross-sectional area of the three-dimensional body, lengths in the transverse direction and in the longitudinal direction of the three-dimensional body, and a height in the layering direction at which a cross section is positioned. In the present exemplary embodiment, the transverse direction is assumed to be the x-axis direction, the longitudinal direction is assumed to be the y-axis direction, and the layering direction is assumed to be the z-axis direction in the following description.

A user selects one or more features of the three-dimensional body, and the setting part 21 sets a feature requirement to detect the one or more features of the three-dimensional body.

The detecting part 22 detects one or more features that satisfy the feature requirement in the three-dimensional-shape data. For example, if the user selects contraction difference as a detection target, the setting part 21 sets a requirement regarding the cross sectional area of the three-dimensional body to detect contraction difference, and the detecting part 22 detects one or more regions that satisfy the predetermined requirement regarding the cross sectional area in the three-dimensional-shape data.

The outputting part 23 outputs information regarding the one or more features detected in the three-dimensional-shape data. For example, the outputting part 23 may present on the display 13 a list containing the information regarding one or more detected regions that satisfy the feature requirement. Alternatively, the outputting part 23 may present one or more regions, which have been detected by the detecting part 22 and satisfy the feature requirement, by changing the colors of the one or more regions on the three-dimensional body displayed on the display 13.

Features to detect in the present exemplary embodiment include a region where contraction difference, pull-in, or swaying occurs as mentioned above. However, features to detect are not limited to the features mentioned above. In the present exemplary embodiment, a description will also be given of a case where a region where a trap or a hollow structure appears is detected as a feature. A trap and a hollow structure are each where a forming material collects. In addition, in the present exemplary embodiment, a description will also be given of a case where a region where a lowest point or an excessive overhang appears and a region where a thin wall or a narrow gap appears are detected as features. A lowest point and an excessive overhang necessitate a support during formation of a three-dimensional body. A thin wall and a narrow gap may cause deformation during formation because of insufficient strength.

Figure 4B:
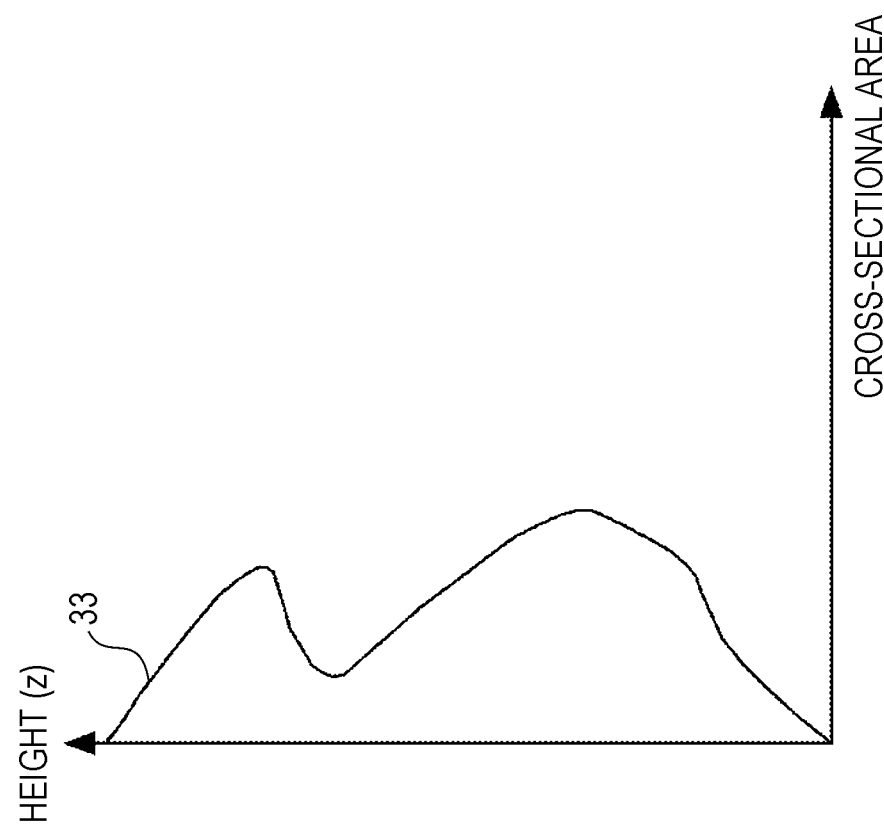
FIGS. 4A and 4B depict an example of a three-dimensional body represented by using voxel data according to the present exemplary embodiment.
Figure 4A:
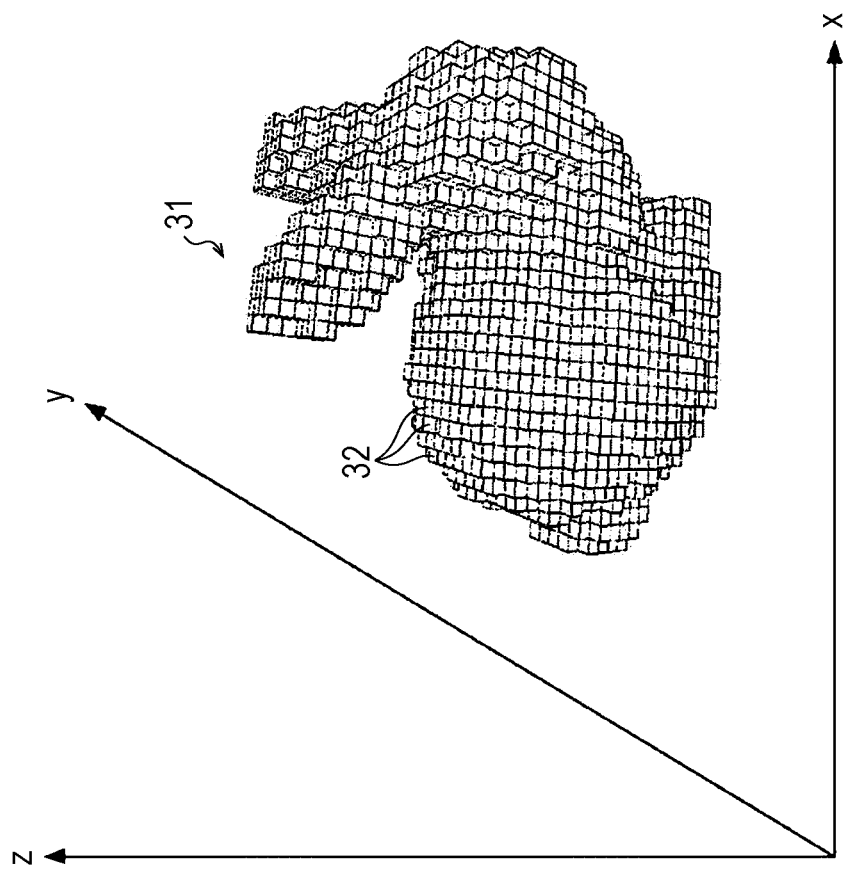

Next, referring to FIGS. 4A and 4B, a description will be given of a three-dimensional body 31 and a relationship between the cross-sectional area and the height in the three-dimensional body 31. FIGS. 4A and 4B depict an example of the three-dimensional body 31 represented by using voxel data according to the present exemplary embodiment. FIG. 4A represents an example of the three-dimensional body 31 formed by voxels 32, and FIG. 4B is a graph depicting an example of a relationship between the cross-sectional area and the height in the three-dimensional body 31.

As depicted in FIG. 4A, the three-dimensional body 31 is formed by using a plurality of voxels 32. A voxel 32 is a basic element of the three-dimensional body 31 and has, for example, a cuboid shape. The shape is not limited to a cuboid and may be a sphere, a solid cylinder, or the like. Voxels 32 are piled up to represent a desired three-dimensional body.

A three-dimensional-object forming method, such as the fused deposition modeling (FDM) method or the selective laser sintering (SLS) method, is adopted to form the three-dimensional body 31. In the FDM method, a thermoplastic resin is fused and layered to form the three-dimensional body 31, and in the SLS method, a metal material in powder form is irradiated with a laser beam and sintered to form the three-dimensional body 31. Three-dimensional-object forming methods other than these two may be adopted. In the present exemplary embodiment, a description will be given of a case where the three-dimensional body 31 is formed by using the SLS method.

A relationship between the height and the cross-sectional area (number of voxels) of the three-dimensional body 31 is represented by the graph depicted in FIG. 4B. As depicted in FIG. 4B, a line 33 represents the relationship between the height in the three-dimensional body 31 and the cross-sectional area of the three-dimensional body 31.

As depicted in FIG. 4B, a feature of the three-dimensional body 31 can be captured by referencing the cross-sectional area against the height. For example, the amount of contraction of a forming material caused by cooling the forming material to form the three-dimensional body 31 is different in a region having a different cross-sectional area. Thus, contraction difference of the forming material occurs during formation of the three-dimensional body 31 in a region where the cross-sectional area changes rapidly as a function of the height in the three-dimensional body 31. Further, if a region having a large cross-sectional area extends over a certain height in the three-dimensional body 31, the amount of contraction accumulated in a forming material is bigger in a lower portion of such a region, and pull-in occurs in the three-dimensional body 31.

In the present exemplary embodiment, a description will be given of a case where cross sections of the three-dimensional body 31 are acquired at predetermined height intervals and the height in the three-dimensional body 31 and the cross-sectional area as a function of the height is used to extract one or more features of the three-dimensional body 31. In the following description, a cross section at each height acquired from the three-dimensional body 31 is referred to as a "layer".

Figure 5:
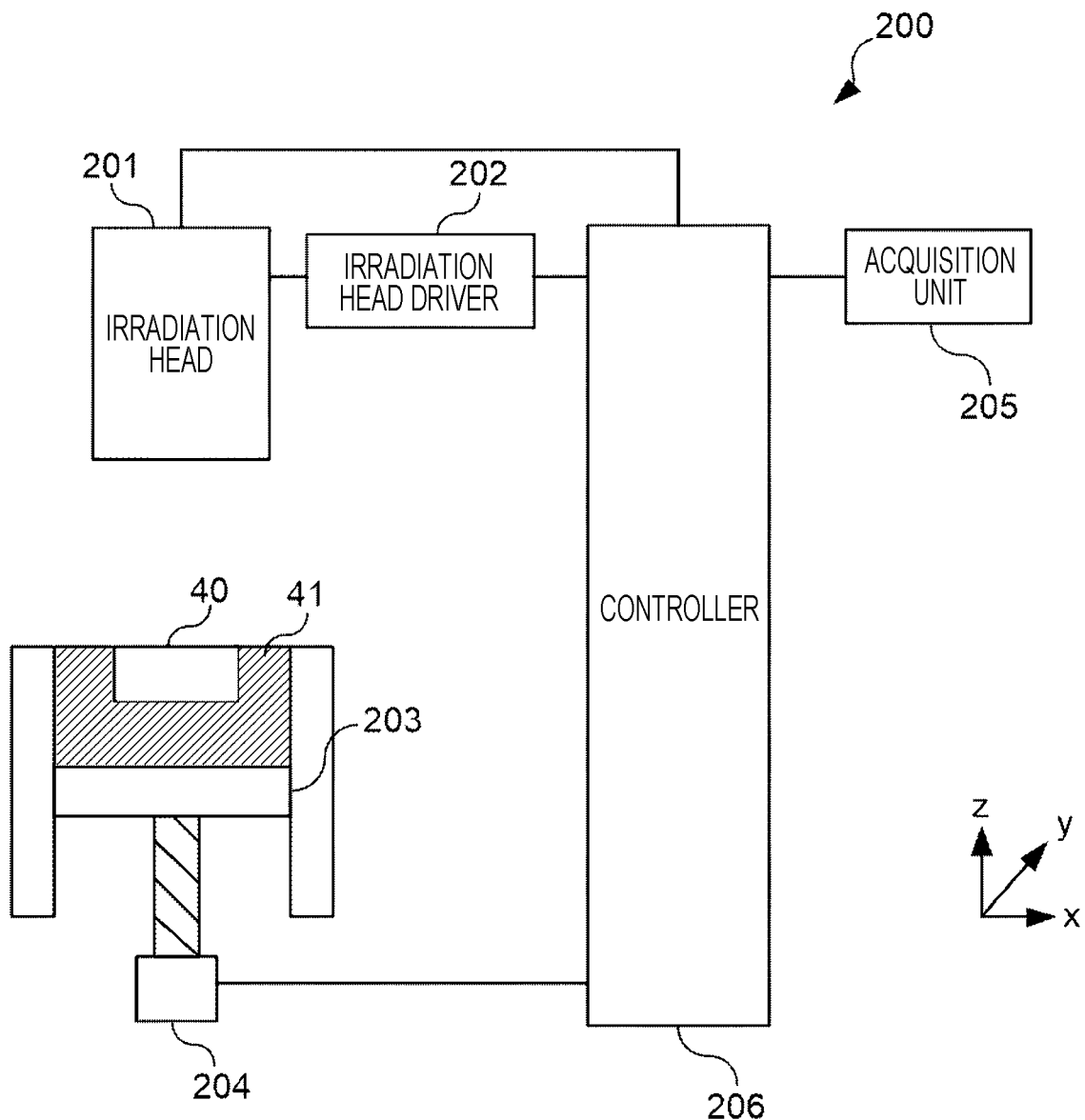
FIG. 5 is a block diagram depicting an example of a three-dimensional-object forming apparatus according to the present exemplary embodiment.

Next, a description will be given of the three-dimensional-object forming apparatus 200, which forms a three-dimensional body 40 by using the three-dimensional-shape data created by the information processing apparatus 10. FIG. 5 is an example of a configuration of the three-dimensional-object forming apparatus 200 according to the present exemplary embodiment. The three-dimensional-object forming apparatus 200 forms a three-dimensional body by using the selective laser sintering method.

As depicted in FIG. 5, the three-dimensional-object forming apparatus 200 includes an irradiation head 201, an irradiation head driver 202, a forming pedestal 203, a forming pedestal driver 204, an acquisition unit 205, and a controller 206. The irradiation head 201, the irradiation head driver 202, the forming pedestal 203, and the forming pedestal driver 204 are an example of a forming part.

The irradiation head 201 is a laser irradiation head 201 that irradiates a forming material 41 with laser light to form the three-dimensional body 40.

The irradiation head 201 is driven by the irradiation head driver 202, and the xy-plane is two-dimensionally scanned with laser light.

The forming pedestal 203 is driven by the forming pedestal driver 204 and moved up and down in the z-axis direction.

The acquisition unit 205 acquires the three-dimensional-shape data created by the information processing apparatus 10.

In accordance with the three-dimensional-shape data acquired by the acquisition unit 205, the controller 206 causes the irradiation head 201 to irradiate with laser light the forming material 41 placed on the forming pedestal 203 and causes the irradiation head driver 202 to control the position to be irradiated with laser light.

Whenever one layer has been formed, the controller 206 causes the forming pedestal driver 204 to lower the forming pedestal 203 by a predetermined layering spacing and injects the forming material 41 onto the forming pedestal 203. In this way, the three-dimensional body 40 based on the three-dimensional-shape data is formed.

Next, a method to extract a feature of a three-dimensional body will be described with reference to FIGS. 6A and 6B to 13, followed by a description of an operation of the information processing apparatus 10 according to the present exemplary embodiment.

FIGS. 6A and 6B are schematic illustrations depicting an example of a three-dimensional body 50 used to describe feature detection according to the present exemplary embodiment. FIG. 6A is a schematic illustration depicting an example of a cross section of the three-dimensional body 50 cut along a plane perpendicular to the z-axis direction. FIG. 6B is a schematic illustration depicting an example of a cross section cut at a layer in the three-dimensional body 50.

At the bottom layer in the three-dimensional body 50 depicted in FIG. 6A, a large cross section of the three-dimensional body 50 appears. The large cross section branches into small cross sections at higher layers of the three-dimensional body 50. In the following description, a cross section of a three-dimensional body is referred to as an "island", and repetition of merging and branching of islands constitutes the three-dimensional body 50.

For example, islands 52, 53, and 54, which are present in the layer in the three-dimensional body 50 enclosed by a rectangle 51 depicted in FIG. 6A, are represented as in FIG.

6B when viewed in the z-axis direction. Reference to layers in the three-dimensional body 50, which are higher than the layer depicted in FIG. 6B, reveals that the islands 52, 53, and 54 repeat merging and separating.

Merging and separating of these islands change the cross-sectional area at each layer in the three-dimensional body 50. Thus, a feature of the three-dimensional body 50 is detected by capturing the difference between cross-sectional areas of each island in layers.

Figure 7:
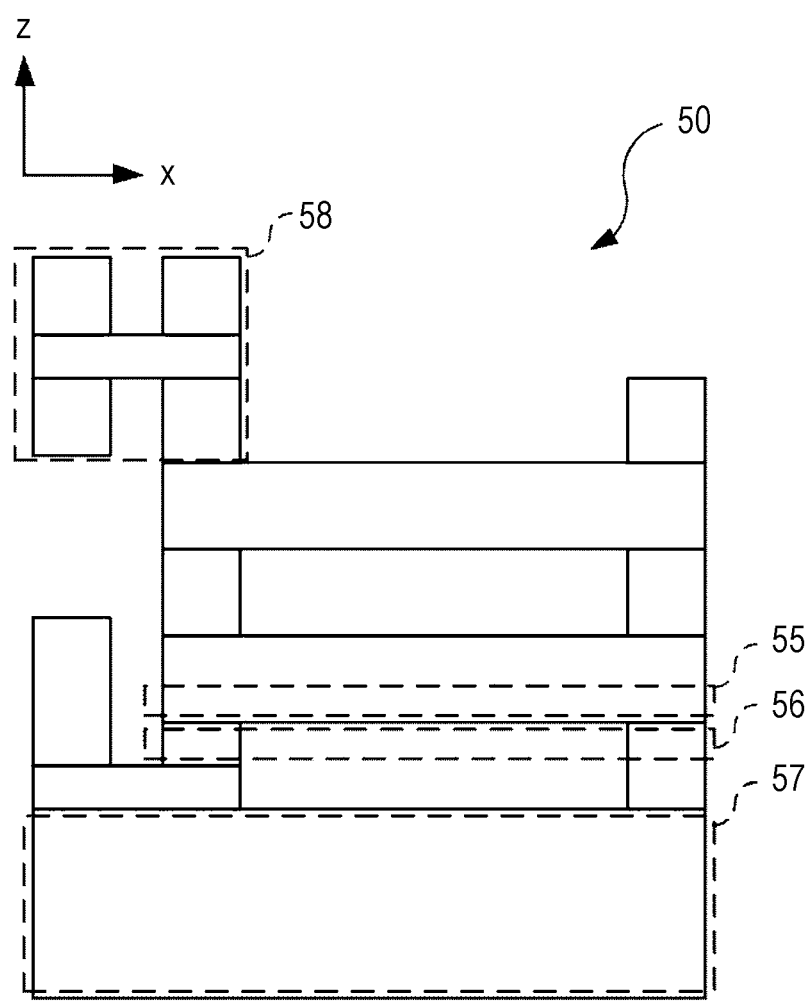
FIG. 7 is a schematic illustration depicting an example of a three-dimensional body used to describe detection of contraction difference, pull-in, and swaying according to the present exemplary embodiment.

Next, referring to FIG. 7, a description will be given of a method to detect a region where contraction difference, pull-in, or swaying occurs during formation of the three-dimensional body 50. FIG. 7 is a schematic illustration depicting an example of the three-dimensional body 50 used to describe detection of contraction difference, pull-in, and swaying according to the present exemplary embodiment.

First, a method to detect contraction difference will be described. The three-dimensional body 50 contracts as the forming material is cooled during formation of the three-dimensional body 50. If the difference between cross-sectional areas of the three-dimensional body 50 at layers adjacent in the z-axis direction is large, the rate of contraction greatly differs, leading to deformation of the three-dimensional body 50.

A region having a large difference between cross-sectional areas, such as a difference between cross-sectional areas of the layer enclosed by a rectangle 55 and the layer enclosed by a rectangle 56 in FIG. 7, is where contraction difference occurs during formation of the three-dimensional body 50.

Thus, as depicted in FIG. 7, a region where contraction difference occurs is detected by referencing and comparing the cross-sectional area of the island enclosed by the rectangle 55 and the cross-sectional area of the island enclosed by the rectangle 56.

The information processing apparatus 10 sets two thresholds as a feature requirement. A first threshold is set for the cross-sectional area of an island, and a second threshold is set for the difference between the cross-sectional areas of connected islands, one each being located in two layers adjacent in the z-axis direction. The feature requirement is used to detect a region where contraction difference occurs. Specifically, the feature requirement is used to search in the three-dimensional-shape data for a region where the cross-sectional area of an island is equal to the first threshold or larger and the difference between the cross-sectional areas of connected islands, one each being located in two layers adjacent in the z-axis direction, is equal to the second threshold or larger. The first threshold, which is set for the cross-sectional area of an island, and the second threshold, which is set for the difference between the cross-sectional areas of connected islands, one each being located in two layers adjacent in the z-axis direction, may be set in advance or may be set by the user.

Next, a method to detect pull-in due to contraction will be described. If the forming material is cooled, the three-dimensional body 50 contracts. Thus, if layers having the same-sized cross sections are consecutively piled up in the z-axis direction to form a body such as a solid cylinder, lower layers in the pile have larger differences in contraction because such layers are pulled by upper layers that undergo contraction in the pile. In short, if layers having large cross-sectional areas are consecutively piled up in the z-axis direction, contraction is gradually accumulated, and pull-in occurs.

A region where an island has a cross-sectional area equal to a certain value or larger and the combined height of connected islands extending in the z-axis direction is equal to a certain value or greater, such as a region enclosed by a rectangle 57 in FIG. 7, is where pull-in occurs during formation of the three-dimensional body 50. Thus, as depicted in FIG. 7, a region where pull-in occurs is detected by referencing the cross-sectional area of an island and the combined height of connected islands extending in the z-axis direction, as enclosed by the rectangle 57.

The information processing apparatus 10 sets two thresholds as a feature requirement. A first threshold is set for the cross-sectional area of an island, and a second threshold is set for the combined height of connected islands extending in the z-axis direction. The feature requirement is used to detect a region where pull-in occurs. Specifically, the feature requirement is used to search in the three-dimensional-shape data for a region where the cross-sectional area of an island is equal to the first threshold or larger and the combined height of connected islands extending in the z-axis direction is equal to the second threshold or greater. The first threshold, which is set for the cross-sectional area of an island, and the second threshold, which is set for the combined height of connected islands extending in the z-axis direction, may be set in advance or may be set by the user.

Next, a description will be given of a method to detect a region where swaying occurs during formation of the three-dimensional body 50. If a portion that has a thin cross section and at least a certain height is blown by components such as a nozzle and a recoater of the three-dimensional-object forming apparatus 200 during formation of the three-dimensional body 50, swaying occurs, leading to deformation of the three-dimensional body 50.

Every region whose upper end connects with a region where connected islands extending in the z-axis direction have a combined height equal to a certain value or greater and a thin cross section, such as a region enclosed by a rectangle 58 in FIG. 7, is where swaying occurs during formation of the three-dimensional body 50. Thus, as enclosed by the rectangle 58 in FIG. 7, a region where swaying occurs is detected by referencing the combined height of connected islands extending in the z-axis direction and the length of the islands in a specified direction.

The information processing apparatus 10 sets two thresholds as a feature requirement. A first threshold is set for the combined height of connected islands extending in the z-axis direction, and a second threshold is set for the length of the islands in a specified direction. The feature requirement is used to detect a region where swaying occurs. Specifically, the feature requirement is used to search in the three-dimensional-shape data for a region where the combined height of connected islands extending in the z-axis direction is equal to the first threshold or greater and the length of the islands in the specified direction is equal to the second threshold or less. The first threshold, which is set for the combined height of connected islands extending in the z-axis direction, and the second threshold, which is set for the length of the islands in the specified direction, may be set in advance or may be set by the user. In the description of the present exemplary embodiment, the specified direction is assumed to be at least one of the x-axis (transverse) direction and the y-axis (longitudinal) direction. However, the specified direction is not limited to the directions mentioned above. The specified direction may be a predetermined direction, such as a scanning direction of the recoater and the nozzle, any direction in the xy-plane (cross section), or a direction specified by the user. Any direction in the xy-plane (cross section) indicates, for example, a width direction that connects opposite ends of an island, and the width direction includes a predetermined point with respect to the island. The predetermined point mentioned here is a point positioned at the center of the island, the center of gravity of the island, or a predetermined position inside the island. The predetermined point may be set in advance or may be set by the user.

Next, referring to FIGS. 8A and 8B and FIGS. 9A and 9B, a description will be given of a method to detect a lowest point and an excessive overhang that appear during formation of a three-dimensional body 60.

FIGS. 8A and 8B are schematic illustrations depicting an example of cross sections of the three-dimensional body 60 used to describe detection of a lowest point according to the present exemplary embodiment. FIG. 8A is a schematic illustration depicting an example of cross sections of the three-dimensional body 60 cut along planes perpendicular to the z-axis direction. FIG. 8B is a schematic illustration depicting an example of cross sections at some layers in the three-dimensional body 60.

As depicted in FIG. 8A, reference to layers adjacent in the z-axis direction in the three-dimensional body 60 reveals that the lower layer enclosed by a rectangle 61 includes an island 62 and the upper layer enclosed by a rectangle 63 includes islands 64 and 65. The upper layer, which is enclosed by the rectangle 63, is superimposed for comparison onto the lower layer, which is enclosed by the rectangle 61 and adjacent to the upper layer in the z-axis direction, as depicted in FIG. 8B.

As depicted in FIG. 8B, a comparison between the lower layer, which is enclosed by the rectangle 61, and the upper layer, which is enclosed by the rectangle 63, reveals a correspondence between an island in the lower layer and an island in the upper layer. The island 62 present in the lower layer, which is enclosed by the rectangle 61, and the island 64 present in the upper layer, which is enclosed by the rectangle 63, are located at the same position, and it can be seen that the island 64 is formed over the island 62.

However, no island is present in the lower layer, which is enclosed by the rectangle 61, at the same position as the island 65 is present in the upper layer, which is enclosed by the rectangle 63. The island 65 is where the three-dimensional body 60 protrudes in the downward direction of the z-axis.

In short, in the cross sections of the three-dimensional body 60 at layers adjacent in the z-axis direction, a region where an island is present in the upper layer and no corresponding island is present in the lower layer is where a lowest point appears during formation of the three-dimensional body 60.

Thus, a lowest point is detected by comparing layers adjacent in the z-axis direction and determining whether corresponding islands are present in both layers.

Cross sections at layers are consecutively acquired and stored in the upward direction of the z-axis, and the cross section at an acquired layer is compared with the cross section at a layer located one layer below. The cross section at the lower layer has been stored in advance. The comparison associates positions of islands in different layers with each other, and thus a region to be a lowest point is detected.

Next, referring to FIGS. 9A and 9B, a description will be given of a method to detect an excessive overhang.

FIGS. 9A and 9B are schematic illustrations depicting an example of cross sections of the three-dimensional body 60 used to describe detection of an excessive overhang according to the present exemplary embodiment. FIG. 9A is a schematic illustration depicting an example of cross sections of the three-dimensional body 60 cut along planes perpendicular to the z-axis direction. FIG. 9B is a schematic illustration depicting an example of cross sections at some layers of the three-dimensional body 60.

An excessive overhang appears if a portion of the three-dimensional body 60 that sticks out has an angle of elevation equal to a certain value or larger and does not have a support. An excessive overhang is detected by using a method similar to the method to detect a lowest point, that is, by comparing cross sections at layers adjacent in the z-axis direction.

As depicted in FIG. 9A, of the layers adjacent in the z-axis direction, the lower layer enclosed by a rectangle 71 includes islands 72 and 73 and the upper layer enclosed by a rectangle 74 includes islands 75 and 76.

A comparison between the lower layer, which is enclosed by the rectangle 71, and the upper layer, which is enclosed by the rectangle 74 and is adjacent to the lower layer in the z-axis direction, reveals a correspondence between an island in the lower layer and an island in the upper layer. Specifically, the island 72 is associated with the island 75, and the island 73 is associated with the island 76 in the z-axis direction.

However, cross-sectional areas differ between the island 73 and the island 76 and between the island 72 and the island 75. Thus, to match the sizes of the islands 72 and 73 in the lower layer with the sizes of the counterparts in the upper layer, the cross-sectional areas of the islands 72 and 73 are increased by a predetermined ratio, and the increased cross-sectional areas of the islands 72 and 73 are compared with the cross-sectional areas of the islands 75 and 76. If the difference between the cross-sectional areas of the islands, which is obtained by this comparison, is equal to a threshold or larger, the islands are a region where an excessive overhang appears during formation of the three-dimensional body 60.

Thus, as depicted in FIG. 9B, layers adjacent in the z-axis direction are compared, and an excessive overhang is detected. Specifically, the cross-sectional area of an island in the lower layer is increased by a certain ratio, and the cross-sectional area of an island in the upper layer is compared with the increased cross-sectional area of the corresponding island in the lower layer. An excessive overhang is detected by determining whether the difference between the cross-sectional areas of the islands in both layers is equal to a threshold or larger.

The information processing apparatus 10 sets an increase ratio and a threshold for the difference between cross-sectional areas as a feature requirement. The information processing apparatus 10 consecutively acquires and stores cross sections at layers in the upward direction of the z-axis and compares an acquired cross section with the cross section at a layer located one layer below. The cross section at the lower layer has been stored in advance. If an island present in one layer corresponds to an island present in a layer located one layer below, the information processing apparatus 10 increases the cross-sectional area of the island in the lower layer by a predetermined ratio. The cross-sectional area of an island in an acquired layer is compared with the increased cross-sectional area of the corresponding island in a layer located one layer below, and a region where an excessive overhang appears is detected if the difference obtained by the comparison is equal to a threshold or larger.

In the present exemplary embodiment, a description has been given of a case where the cross-sectional area of an island in the lower layer is increased to match the size of the island in the lower layer with the size of the counterpart in the upper layer in the three-dimensional body 60. However, this procedure is not meant to be limiting. The cross-sectional area of the island in the upper layer may be reduced. Further, if the cross-sectional area of an island in the lower layer is larger than the cross-sectional area of the counterpart in the upper layer, the cross-sectional area of the island in the lower layer may be reduced, or alternatively, the cross-sectional area of the island in the upper layer may be increased.

In the present exemplary embodiment, a description has been given of a case where the ratio by which the cross-sectional area is increased is determined in advance. However, this procedure is not meant to be limiting. The ratio may be specified by the user, or alternatively, the ratio may be derived from the comparison between the cross section at the lower layer and the cross section at the upper layer in the three-dimensional body 60. For example, the cross-sectional shape of an island in the lower layer may be extracted, and a cross-sectional shape corresponding to the extracted cross-sectional shape may be detected in the upper layer. Then, a ratio may be derived so that the cross-sectional shape extracted from the lower layer matches the cross-sectional shape detected in the upper layer.

With respect to cross sections at layers adjacent in the z-axis direction in the present exemplary embodiment, examples of a shape difference include a case where an island present in the upper layer is missing in the lower layer and a case where an island in each layer has the corresponding island in another layer and these corresponding islands have different cross-sectional areas.

Next, referring to FIGS. 10A and 10B, a description will be given of a method to detect a trap and a hollow structure. FIGS. 10A and 10B are schematic illustrations depicting an example of a cross section of a three-dimensional body 80 used to describe detection of a trap and a hollow structure according to the present exemplary embodiment.

FIG. 10A is a schematic illustration depicting an example of a cross section of the three-dimensional body 80 cut along a plane perpendicular to the z-axis direction. FIG. 10B is a schematic illustration depicting an example of a cross section of the three-dimensional body 80 at a layer.

For example, FIG. 10B depicts the cross section of the three-dimensional body 80 at a layer enclosed by a rectangle 81 depicted in FIG. 10A.

As depicted in FIG. 10B, if the three-dimensional body 80 has a closed region that is surrounded by voxels 82 and that has no voxel inside, a trap or a hollow structure appears during formation of the three-dimensional body 80. A trap is where a forming material collects, and a hollow structure is where a forming material collects and a cavity is formed inside the three-dimensional body 80. In the following description, a region where no voxel is present is referred to as an "empty voxel", and an empty voxel surrounded by voxels is referred to as a "closed empty voxel". One or more closed empty voxels according to the present exemplary embodiment are an example of an opening.

In other words, a region where one or more closed empty voxels are present in the cross section of the three-dimensional body 80 at an acquired layer is where a trap or a hollow structure appears during formation of the three-dimensional body 80.

Cross sections at layers in the three-dimensional body 80 are consecutively acquired in the downward direction of the z-axis, and it is determined whether one or more closed empty voxels are present in each cross section. A region to be a trap or a hollow structure is detected in this way.

A trap is formed during formation of the three-dimensional body 80 if one or more closed empty voxels, which are present in the topmost layer and in the corresponding region in each layer underneath in the three-dimensional body 80, are all connected and one or more voxels or a forming pedestal is present under the closed empty voxels to close the closed empty voxels in the z-axis direction.

In other words, a region to be a trap is detected by searching for one or more closed empty voxels that have a height equal to a predetermined threshold or greater and that are closed by one or more voxels or a forming pedestal at the bottom in the z-axis direction.

A hollow structure is formed during formation of the three-dimensional body 80 if one or more closed empty voxels, which are present in layers other than the topmost layer in the three-dimensional body 80, are all connected and one or more voxels or a forming pedestal is present to close the closed empty voxels at the top and at the bottom in the z-axis direction.

Figure 11A:
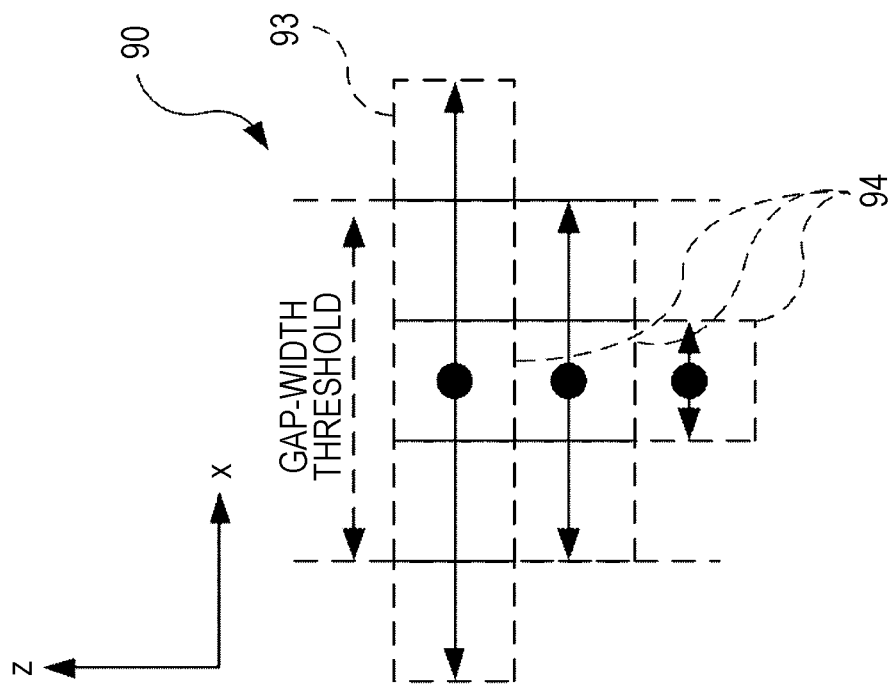
FIGS. 11A and 11B are schematic illustrations each depicting an example of a cross section of a three-dimensional body used to describe detection of a thin wall or a narrow gap according to the present exemplary embodiment.
Figure 11B:
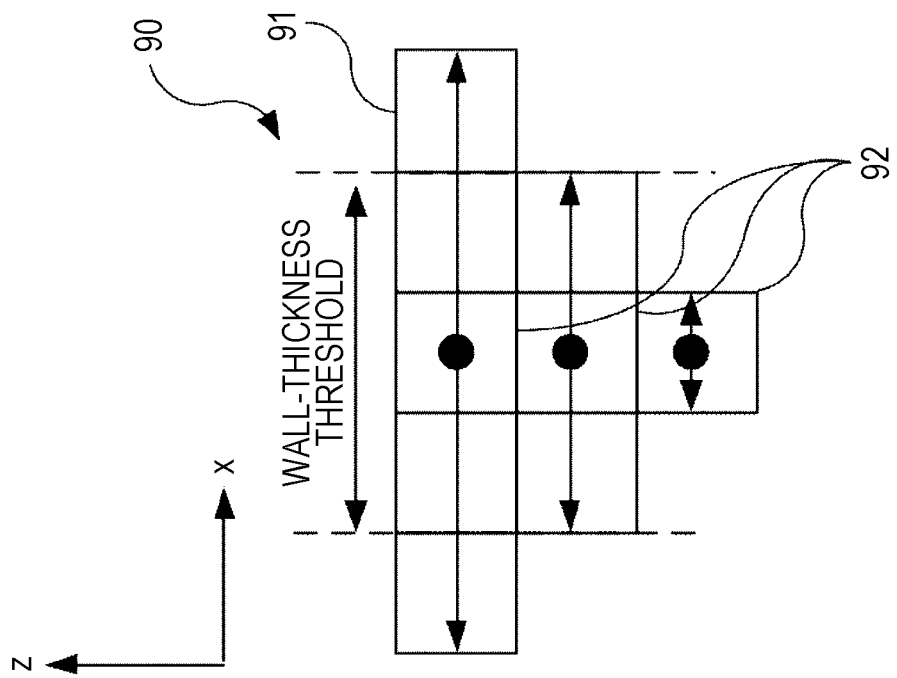

Next, referring to FIGS. 11A and 11B, a description will be given of a method to detect a thin wall and a narrow gap. FIGS. 11A and 11B are each a schematic illustration of voxels used to describe a peak voxel 92 or 94 according to the present exemplary embodiment.

First, any direction in a three-dimensional body 90 is specified, and a signed distance field (SDF) is calculated from a voxel to the nearest edge of the three-dimensional body 90 in the specified direction. In the following description, a value of the calculated signed distance field is referred to as a "distance".

Of voxels 91 arranged side by side in the specified direction, a peak voxel 92 is defined as a voxel 91 having the maximum distance, and a wall thickness is defined as the distance from the peak voxel 92 to the edge of the three-dimensional body 90 multiplied by 2. Where a defined wall thickness is equal to a predetermined wall-thickness threshold or less is detected as a region where a thin wall appears. A distance (value of a signed distance field) is positive for a voxel located inside the three-dimensional body 90 and negative for a voxel such as an empty voxel, which is located outside the three-dimensional body 90.

For example, as depicted in FIG. 11A, for the three-dimensional body 90, in which voxels 91 are arranged side by side, if the x-axis direction for the three-dimensional body 90 is specified, a distance is calculated from each voxel 91 to the edge of the three-dimensional body 90 in the x-axis direction. In FIG. 11A, of voxels 91 arranged side by side in the x-axis direction, a voxel 91 located at the center has the maximum distance in the x-axis direction, and thus the voxel 91 located at the center is a peak voxel 92.

If a wall thickness, which is defined as the distance for a peak voxel 92 multiplied by 2, is equal to the predetermined wall-thickness threshold or less, a region where the peak voxel 92 is located is a region where a thin wall appears.

A thin wall in every direction is detected for the three-dimensional body 90 by applying the above method in every direction to define a peak voxel 92 and to derive a wall thickness. A narrow gap is detected by applying the above method to empty voxels 93.

Specifically, as depicted in FIG. 11B, a distance from an empty voxel 93 to the nearest edge of the three-dimensional body 90 in a specified direction is calculated, and of empty voxels 93 arranged side by side in the specified direction, a peak voxel 94 is defined as the empty voxel 93 having the smallest distance. A gap width is defined as the distance from the peak voxel 94, which is defined, to the edge of the three-dimensional body 90 multiplied by 2. Where a gap width, which is defined, is equal to a predetermined gap-width threshold or more is detected as a narrow gap. A distance for an empty voxel is a negative value, and the gap-width threshold is set to a negative value.

The wall-thickness threshold and the gap-width threshold may each be set in advance or may be a value set by the user.

Figure 12:
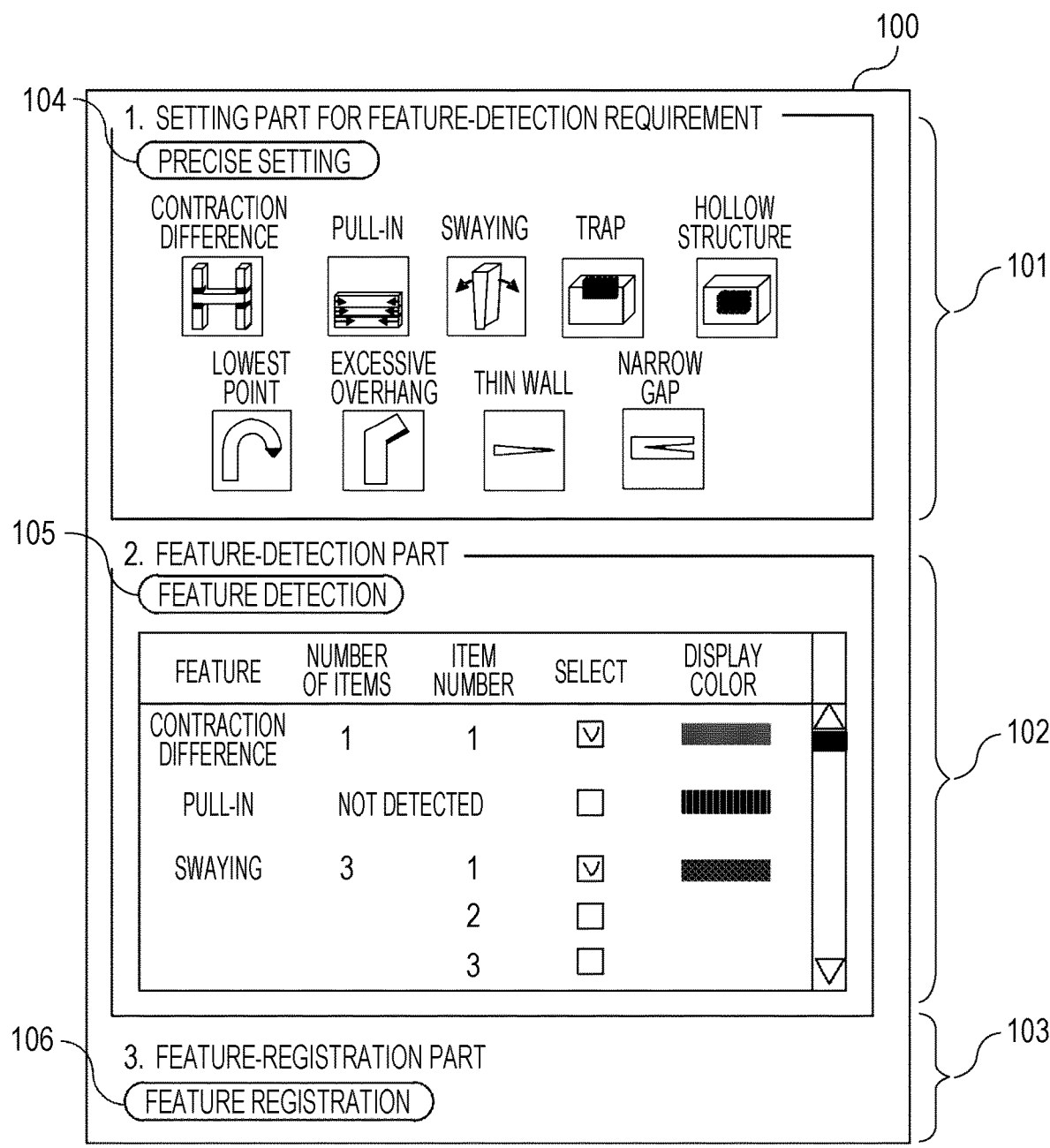
FIG. 12 is a schematic illustration depicting an example of a screen for setting one or more features to detect according to the present exemplary embodiment.

Next, referring to FIGS. 12 and 13, a description will be given of a setting screen and a precise-setting screen. The setting screen is used to set one or more features of a three-dimensional body to detect, and the precise-setting screen is used to set a precise value for each feature to detect, such as a threshold. First, referring to FIG. 12, a setting screen 100 will be described. FIG. 12 is a schematic illustration depicting an example of a screen for setting one or more features to detect according to the present exemplary embodiment.

As depicted in FIG. 12, the setting screen 100 includes a setting part for feature-detection requirement 101, a feature-detection part 102, and a feature-registration part 103.

The setting part for feature-detection requirement 101 displays icons associated with various features so as to enable the user to select one or more features to detect in the three-dimensional-shape data. The information processing apparatus 10 acquires and sets a requirement regarding the features selected in the setting part for feature-detection requirement 101. The setting part for feature-detection requirement 101 includes a precise setting button 104, and a precise-setting screen described below is displayed at the push of the precise setting button 104.

The feature-detection part 102 includes a feature-detection button 105. At the push of the feature-detection button 105, the feature-detection part 102 detects in the three-dimensional-shape data one or more features that each satisfy the requirement regarding the features set by the setting part for feature-detection requirement 101 and displays a list of detected features as a detection result. A description is given of a case where the feature-detection part 102 in the present exemplary embodiment displays a list as a detection result. However, this procedure is not meant to be limiting. For example, the display 13 may display a three-dimensional body and may indicate by using different colors on the displayed three-dimensional body one or more regions that correspond to the detected features.

The feature-registration part 103 includes a feature-registration button 106, and at the push of the feature-registration button 106, the feature-registration part 103 associates each detected feature with one or more voxels that correspond to the detected feature and stores the detected feature in association with the one or more voxels. When the detected feature is stored in association with the one or more voxels, the detected feature is stored as an attribute value. An attribute value may be a continuous value that represents a feature value of the detected feature or a discrete value that represents in a stepwise manner a degree of feature. In addition, when the one or more regions that correspond to the detected feature are displayed on the three-dimensional body, the color in which a region is displayed may be changed in accordance with the attribute value.

Next, referring to FIG. 13, a precise-setting screen 110 will be described. FIG. 13 is a schematic illustration depicting an example of a screen for setting precise feature requirements for detecting one or more features according to the present exemplary embodiment.

Figure 13:
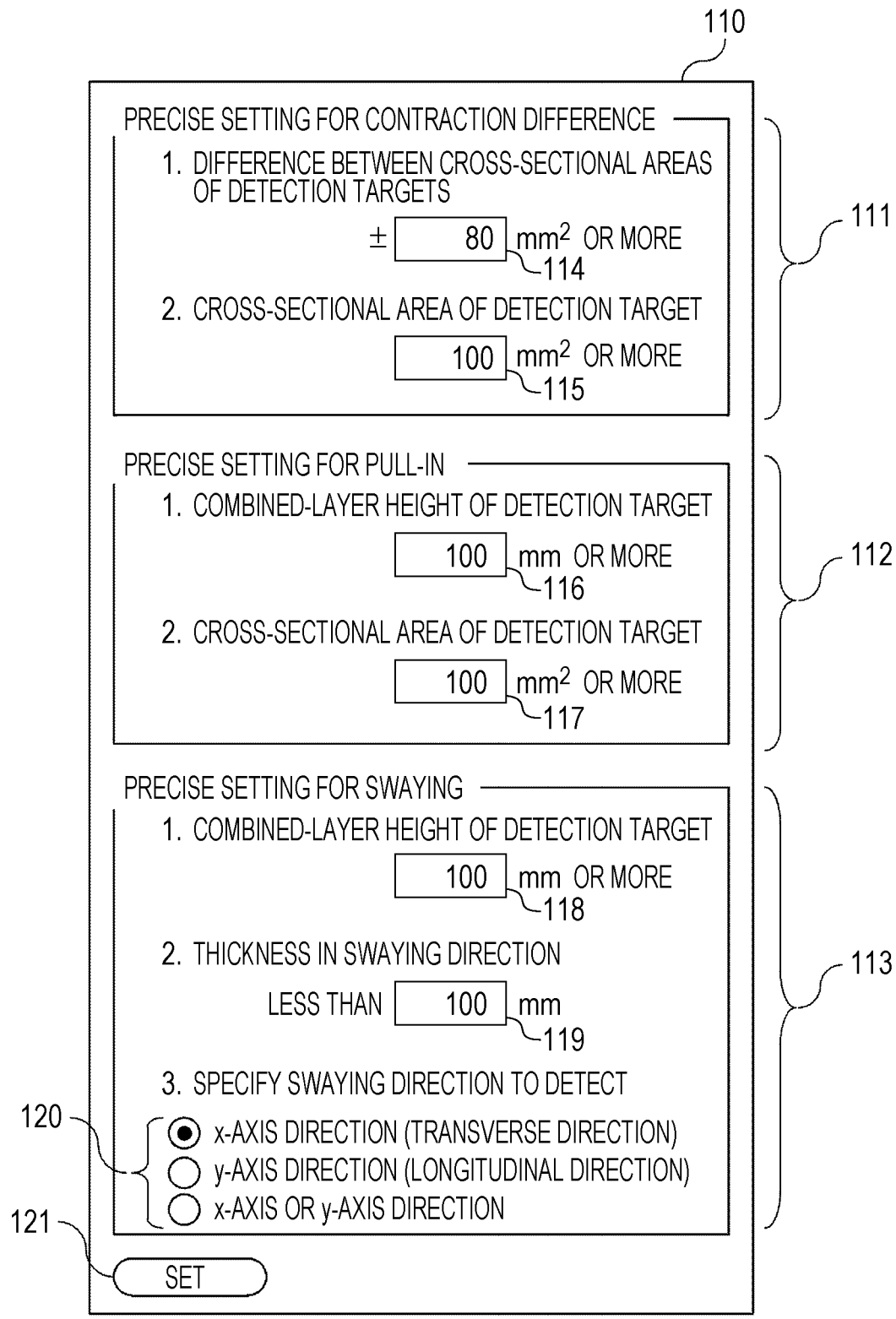
FIG. 13 is a schematic illustration depicting an example of a screen for setting precise feature requirements for detecting one or more features according to the present exemplary embodiment.

As depicted in FIG. 13, the precise-setting screen 110 includes a precise-setting part for contraction difference 111, a precise-setting part for pull-in 112, a precise-setting part for swaying 113, and a setting button 121.

The precise-setting part for contraction difference 111 includes an input box for the difference between cross-sectional areas 114 and an input box for the threshold for the cross-sectional area 115. The input box for the difference between cross-sectional areas 114 is used to input a threshold for the difference between cross-sectional areas of detection targets. The input box for the threshold for the cross-sectional area 115 is used to input a threshold for the cross-sectional area of a detection target with respect to contraction difference.

The precise-setting part for pull-in 112 includes an input box for the combined-layer height 116 and an input box for the threshold for the cross-sectional area 117. The input box for the combined-layer height 116 is used to input a threshold for the combined-layer height of a detection target. The input box for the threshold for the cross-sectional area 117 is used to input a threshold for the cross-sectional area of a detection target with respect to pull-in.

The precise-setting part for swaying 113 includes an input box for the threshold for the combined-layer height 118, an input box for the thickness threshold 119, and buttons for specifying the swaying direction 120. The input box for the threshold for the combined-layer height 118 is used to input a threshold for the height of a detection target with respect to swaying. The input box for the thickness threshold 119 is used to input a threshold for the thickness in a specified direction, and the buttons for specifying the swaying direction 120 are used to specify a direction in which swaying is to be detected.

At the push of the setting button 121, The precise-setting screen 110 sets and stores as a feature requirement the content that has been input into the precise-setting part for contraction difference 111, into the precise-setting part for pull-in 112, and into the precise-setting part for swaying 113.

In the precise-setting screen 110 according to the present exemplary embodiment, which has been described, contraction difference, pull-in, and swaying are selected as features for which precise feature requirements are set. However, these selections are not meant to be limiting. Precise feature requirements may be set for an excessive overhang, a thin wall, and a narrow gap. A threshold for a cross-sectional area may be set as a precise feature requirement for an excessive overhang, a wall-thickness threshold may be set as a precise feature requirement for a thin wall, and a gap-width threshold may be set as a precise feature requirement for a narrow gap.

Figure 14:
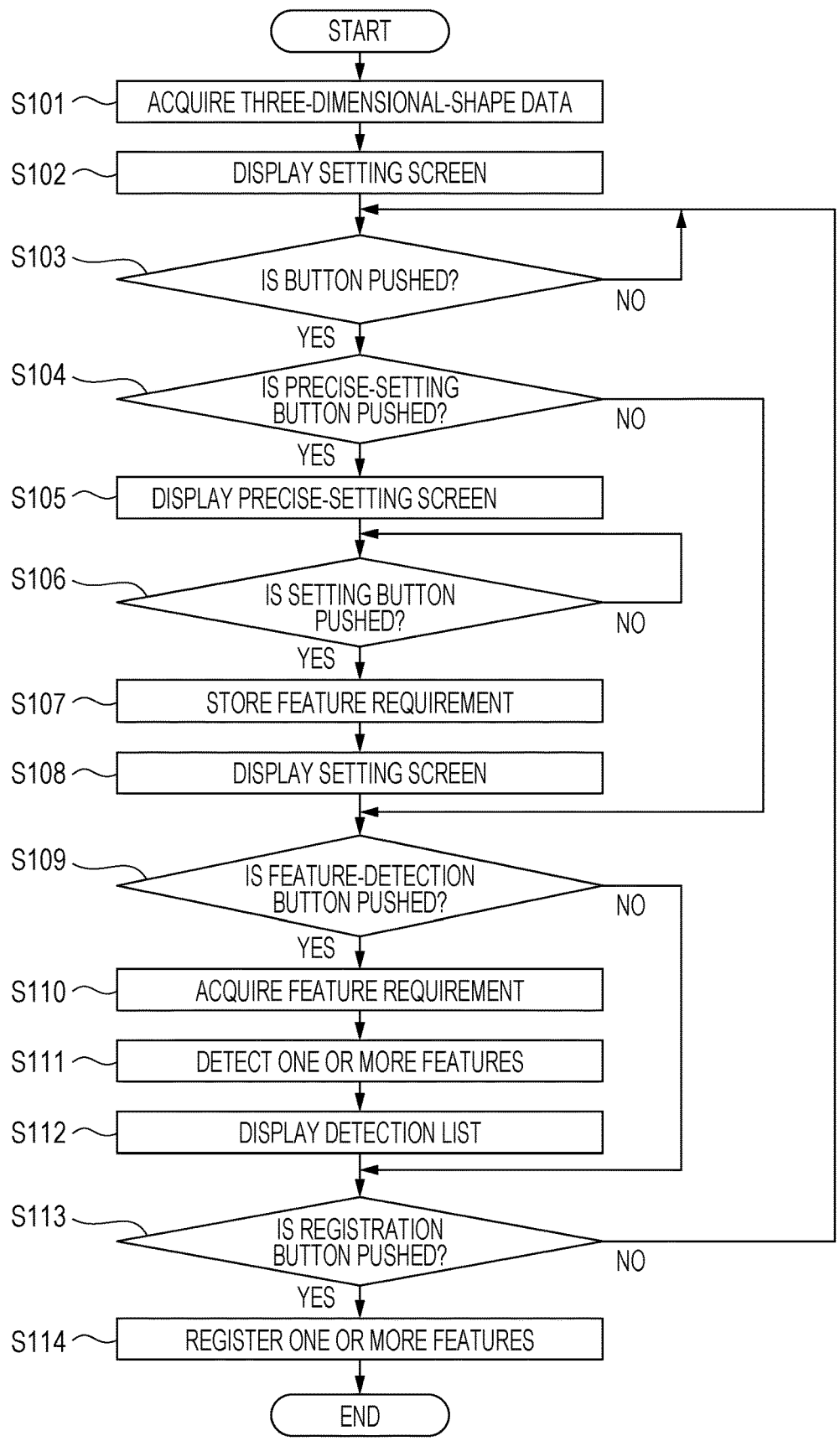
FIG. 14 is a flowchart depicting an example of information processing according to the present exemplary embodiment.

Next, referring to FIG. 14, an operation of the information processing program according to the present exemplary embodiment will be described. FIG. 14 is a flowchart depicting an example of information processing according to the present exemplary embodiment. The CPU 11A loads the information processing program from the ROM 11B or the nonvolatile memory 11D and executes the program, and the information processing depicted in FIG. 14 is performed. The information processing depicted in FIG. 14 is performed, for example, in response to an input from the user to execute the information processing program.

In step S101, the CPU 11A acquires the three-dimensional-shape data.

In step S102, the CPU 11A displays the setting screen.

In step S103, the CPU 11A determines whether a button has been pushed in the setting screen. At the push of a button (YES in step S103), the CPU 11A makes the process proceed to step S104. In contrast, while no button is pushed (NO in step S103), the CPU 11A waits for a button to be pushed.

In step S104, the CPU 11A determines whether the precise-setting button has been pushed in the setting screen. At the push of the precise-setting button (YES in step S104), the CPU 11A makes the process proceed to step S105. In contrast, if the precise-setting button is not pushed (NO in step S104), the CPU 11A makes the process proceed to step S109.

In step S105, the CPU 11A displays the precise-setting screen.

In step S106, the CPU 11A determines whether the setting button has been pushed in the precise-setting screen. At the push of the setting button (YES in step S106), the CPU 11A makes the process proceed to step S107. In contrast, while the setting button is not pushed (NO in step S106), the CPU 11A waits for the setting button to be pushed.

In step S107, the CPU 11A sets and stores a feature requirement that has been input into the precise-setting screen by the user.

In step S108, the CPU 11A displays the setting screen.

In step S109, the CPU 11A determines whether a feature-detection button has been pushed in the setting screen. At the push of the feature-detection button (YES in step S109), the CPU 11A makes the process proceed to step S110. In contrast, if the feature-detection button is not pushed (NO in step S109), the CPU 11A makes the process proceed to step S113.

In step S110, the CPU 11A acquires a feature requirement.

In step S111, the CPU 11A detects one or more physical features that satisfy the feature requirement in the three-dimensional-shape data.

In step S112, the CPU 11A displays a detection result as a detection list.

In step S113, the CPU 11A determines whether a registration button has been pushed in the setting screen. At the push of the registration button (YES in step S113), the CPU 11A makes the process proceed to step S114. In contrast, if the registration button is not pushed (NO in step S113), the CPU 11A makes the process proceed to step S103.

In step S114, the CPU 11A registers and stores information regarding one or more detected features.

The present disclosure has been described by using the exemplary embodiment as above, but the scope of the present disclosure is not limited to the range described by using the above exemplary embodiment. Various modifications and improvements to the above exemplary embodiment are possible without departing from the spirit of the present disclosure, and embodiments incorporating such modifications or improvements are also within the technical scope of the present disclosure.

For example, in the present exemplary embodiment, a description has been given of a case where the information processing apparatus 10, which detects one or more physical features in the three-dimensional-shape data, and the three-dimensional-object forming apparatus 200, which forms a three-dimensional body in accordance with the three-dimensional-shape data, are separately installed. However, this configuration is not meant to be limiting. The three-dimensional-object forming apparatus 200 may have a function of the information processing apparatus 10.

Specifically, the acquisition unit 205 of the three-dimensional-object forming apparatus 200 may acquire voxel data, and the controller 206 may perform the information processing in FIG. 14 and detect one or more features of a three-dimensional body in the three-dimensional-shape data.

In the embodiment above, the term "processor" refers to hardware in a broad sense. Examples of the processor include general processors (e.g., CPU: Central Processing Unit), dedicated processors (e.g., GPU: Graphics Processing Unit, ASIC: Application Specific Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

Further, in the above exemplary embodiment, a description has been given of a case where the information processing program, which detects one or more features of a three-dimensional body in the three-dimensional-shape data, is stored in the repository 15, but the present disclosure is not limited to this example. The information processing program according to the present exemplary embodiment may be recorded in a computer-readable recording medium and provided. For example, the information processing program according to the present exemplary embodiment may be recorded on an optical disc, such as a compact disc ROM (CD-ROM) or a digital versatile disc ROM (DVD-ROM), and provided. The information processing program according to the present exemplary embodiment may be recorded in a semiconductor memory, such as a universal-serial-bus (USB) memory or a memory card, and provided. Further, the information processing program according to the present exemplary embodiment may be acquired from an external apparatus via a communication line connected to the communication unit 14.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to
acquire three-dimensional-shape data that is data for a three-dimensional body and that represents a shape of a three-dimensional object to be formed using a three-dimensional-object forming method,
set in advance a feature requirement that indicates one or more features concerning a cross section of the three-dimensional body,
detect one or more features that satisfy the feature requirement in the three-dimensional-shape data the one or more detected features indicative of deformation occurring during the formation of the three-dimensional structure, and
output information regarding the one or more features detected in the three-dimensional-shape data.

2. The information processing apparatus according to claim 1,
wherein the feature requirement concerns a cross-sectional area at a cross section of the three-dimensional body.

3. The information processing apparatus according to claim 2,
wherein the processor detects by using the feature requirement a region where contraction difference occurs in the three-dimensional body during formation of the three-dimensional body.

4. The information processing apparatus according to claim 3,
wherein the feature requirement further includes a height in a layering direction of the three-dimensional body.

5. The information processing apparatus according to claim 4,
wherein the processor detects by using the feature requirement a region where pull-in due to contraction occurs in the three-dimensional body during formation of the three-dimensional body.

6. The information processing apparatus according to claim 2,
wherein the feature requirement further includes a height in a layering direction of the three-dimensional body.

7. The information processing apparatus according to claim 6,
wherein the processor detects by using the feature requirement a region where pull-in due to contraction occurs in the three-dimensional body during formation of the three-dimensional body.

8. The information processing apparatus according to claim 1,
wherein the feature requirement concerning a cross section of the three-dimensional body further includes information concerning at least one of a transverse direction of the three-dimensional body, a longitudinal direction of the three-dimensional body, and a width direction of the cross section, the width direction including a specified position in the cross section.

9. The information processing apparatus according to claim 8,
wherein the processor detects by using the feature requirement a region where swaying occurs during formation of the three-dimensional body.

10. The information processing apparatus according to claim 1,
wherein the feature requirement further includes a shape difference between cross sections adjacent in a layering direction of the three-dimensional body.

11. The information processing apparatus according to claim 10,
wherein the processor detects by using the feature requirement a region where the shape difference necessitates a support during formation of the three-dimensional body.

12. The information processing apparatus according to claim 1,
wherein the feature requirement concerning a cross section of the three-dimensional body further includes information concerning an opening surrounded by the three-dimensional body.

13. The information processing apparatus according to claim 1,
wherein the processor detects by using the feature requirement a region where at least one of a trap and a hollow structure appears during formation of the three-dimensional body, and
wherein the trap is where a forming material collects, and the hollow structure is where a forming material collects inside the three-dimensional body and a cavity is formed inside the three-dimensional body.

14. The information processing apparatus according to claim 1,
wherein the feature requirement further includes information concerning a distance from inside the three-dimensional body to an edge of the three-dimensional body.

15. The information processing apparatus according to claim 14,
wherein the processor detects by using the feature requirement a region where a thin wall appears during formation of the three-dimensional body.

16. The information processing apparatus according to claim 1,
wherein the feature requirement further includes information concerning a distance from outside the three-dimensional body to an edge of the three-dimensional body.

17. The information processing apparatus according to claim 16,
wherein the processor detects by using the feature requirement a region where a narrow gap appears during formation of the three-dimensional body.

18. The information processing apparatus according to claim 1,
wherein the three-dimensional-shape data represents the three-dimensional body by using a plurality of voxels.

19. The information processing apparatus according to claim 18,
wherein the processor associates each feature that is detected with one or more of the plurality of voxels, the one or more voxels corresponding to a region where the feature is detected, and the processor stores the feature in association with the one or more voxels.

20. The information processing apparatus according to claim 18,
wherein each voxel has a cuboid, spherical, or cylindrical shape.

21. The information processing apparatus according to claim 1,
wherein the one or more detected features indicative of deformation occurring during the formation of the three-dimensional structure include at least one of
a region where a contraction difference occurs during formation of the three-dimensional structure,
a region where pull-in occurs during the formation of the three-dimensional structure,
a region where swaying occurs during the formation of the three-dimensional structure,
a region where a shape difference between adjacent cross sections adjacent in a layering direction necessitates a support during the formation of the three-dimensional structure,
a region where at least one of a trap and a hollow structure appears during the formation of the three-dimensional structure,
a region where a thin wall appears during the formation of the three-dimensional structure, and
a region where a narrow gap appears during the formation of the three-dimensional structure.

22. A non-transitory computer readable medium storing a program causing a computer to execute a process for information processing, the process comprising:
acquiring three-dimensional-shape data that is data for a three-dimensional body and that represents a shape of a three-dimensional object to be formed using a three-dimensional-object forming method;
setting in advance a feature requirement that indicates one or more features concerning a cross section of the three-dimensional body;
detecting one or more features that satisfy the feature requirement in the three-dimensional-shape data, the one or more detected features indicative of deformation occurring during the formation of the three-dimensional structure; and outputting information regarding the one or more features detected in the three-dimensional-shape data.

23. The non-transitory computer readable medium according to claim 22,
wherein the one or more detected features indicative of deformation occurring during the formation of the three-dimensional structure include at least one of
a region where a contraction difference occurs during formation of the three-dimensional structure,
a region where pull-in occurs during the formation of the three-dimensional structure,
a region where swaying occurs during the formation of the three-dimensional structure,
a region where a shape difference between adjacent cross sections adjacent in a layering direction necessitates a support during the formation of the three-dimensional structure,
a region where at least one of a trap and a hollow structure appears during the formation of the three-dimensional structure,
a region where a thin wall appears during the formation of the three-dimensional structure, and
a region where a narrow gap appears during the formation of the three-dimensional structure.

24. The non-transitory computer readable medium according to claim 22,
wherein the three-dimensional body is represented in the three-dimensional-shape data by a plurality of voxels, each voxel having a cuboid, spherical, or cylindrical shape.

* * * * *